United States Patent
Thiele

(10) Patent No.: US 10,162,777 B2
(45) Date of Patent: Dec. 25, 2018

(54) TRANSMISSION UNIT WITH CHECKING FUNCTION

(71) Applicant: Robert Bosch GmbH, Stuttgart (DE)

(72) Inventor: Stefan Thiele, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 228 days.

(21) Appl. No.: 15/316,056

(22) PCT Filed: May 26, 2015

(86) PCT No.: PCT/EP2015/061512
§ 371 (c)(1),
(2) Date: Feb. 2, 2017

(87) PCT Pub. No.: WO2015/185386
PCT Pub. Date: Dec. 10, 2015

(65) Prior Publication Data
US 2017/0192920 A1  Jul. 6, 2017

(30) Foreign Application Priority Data
Jun. 3, 2014 (DE) .......... 10 2014 210 505

(51) Int. Cl.
*G06F 13/366* (2006.01)
*G06F 13/42* (2006.01)
(Continued)

(52) U.S. Cl.
CPC ........ *G06F 13/366* (2013.01); *G06F 13/4068* (2013.01); *G06F 13/42* (2013.01);
(Continued)

(58) Field of Classification Search
None
See application file for complete search history.

(56) References Cited

U.S. PATENT DOCUMENTS 7,242,766 B1 * 7/2007 Lyle .......... H04L 9/12
380/2
8,155,528 B2 * 4/2012 Nelson .......... H04L 63/126
398/135
(Continued)

FOREIGN PATENT DOCUMENTS

DE 102010029349 A1 12/2011
DE 102012210722 A1 2/2013
EP 2637361 A1 9/2013

OTHER PUBLICATIONS

International Search Report dated Jul. 24, 2015, issued in International Application No. PCT/EP2015/061512, filed May 26, 2015.
(Continued)

*Primary Examiner* — Michael Sun
(74) *Attorney, Agent, or Firm* — Norton Rose Fulbright US LLP; Gerard Messina

(57) ABSTRACT

A transmission unit for connection to a first bus system, the transmission unit receiving messages via the first bus system, the messages being constructed as a succession of a first bit sequence, of at least one control signal and of a second bit sequence, the first bit sequence of a received message being forwarded by the transmission unit to a processing station, at least one predefined control signal of the received message being checked by the transmission unit, the second bit sequence of the received message being forwarded by the transmission unit to the processing station if the predefined signal of the received message has a predefined value, instead of the second bit sequence, the transmission unit sending a predefined or predefinable terminating bit sequence to the processing station, if the predefined control signal of the received message has a value that deviates from the predefined value.

14 Claims, 3 Drawing Sheets

(51) Int. Cl.
*H04L 12/40* (2006.01)
*G06F 13/40* (2006.01)

(52) U.S. Cl.
CPC ............... *H04L 12/40084* (2013.01); *H04L 2012/40215* (2013.01)

(56) References Cited

U.S. PATENT DOCUMENTS

| 2002/0184314 A1* | 12/2002 | Riise ................. H04L 12/1859 709/205 |
| 2003/0123389 A1* | 7/2003 | Russell .............. G06F 11/273 370/230 |
| 2006/0256711 A1* | 11/2006 | Kusama ............. H04L 43/0811 370/216 |
| 2006/0257143 A1* | 11/2006 | Cavazzoni .......... H04J 14/0227 398/49 |
| 2008/0228934 A1 | 9/2008 | Eschholz |

OTHER PUBLICATIONS

Robert Bosch GmbH, "CAN Specification 2.0" 1991 1-73.
Hartwich, Florian "CAN with Flexible Data-Rate" Robert Bosch GmbH; 13th International CAN Conference, iCC 2012.

* cited by examiner

TRANSMISSION UNIT WITH CHECKING FUNCTION

FIELD OF THE INVENTION

The present invention relates to a transmission unit with a checking function.

BACKGROUND INFORMATION

One bus system is the Controller Area Network (CAN). It is described, for example, in the BOSCH CAN specification 2.0, which may be downloaded from the Robert Bosch GmbH website http://www.semiconductors.bosch.de. The CAN protocol is widely common in the automobile industry, in industrial automatization or also in building networking systems.

The bus system in such cases is usually a cable pair such as, for example, a twisted copper cable. Communication users connected to the bus system, also called CAN nodes, may exchange messages via the bus system, which contain data to be communicated, for example. The messages are constructed according to the rules predefined by the CAN protocol.

The messages to be transmitted in the CAN protocol include a header, a data field and a final section, the data to be transmitted being included in the data field. The header of the message includes a Start-of-Frame bit an Arbitration field and a Control field. The Arbitration field includes the identifier, which determines the priority of the message. CAN supports identifier lengths of 11 bits ("Standard Format" or "Base Format") and 29 bits ("Extended Format"). The Control field includes a Data Length Code, which predefines the length of the data field. The final section of the message includes a CRC field, an Acknowledge field and an End-of-Frame field. This CAN protocol is hereafter referred to as "Classic CAN". CAN bit rates up to 1 Mbit/s are achieved via Classic CAN.

The individual bits are usually represented as voltage differences between the lines of the bus system, a first voltage difference corresponding to a logic "0" and a second voltage difference corresponding to a logic "1". In CAN the first voltage difference, which corresponds to a "0", is also referred to as "dominant level", and the second voltage difference, which corresponds to a logic "1", is referred to as "recessive level".

The roles of sender and receiver for the messages to be transmitted are assigned among the users by an arbitration method based on information from the header of the messages. Arbitration method in this context means that, based on an identifier included in the message, it is negotiated which user obtains transmit access to the bus if multiple users attempt to send a message simultaneously, precisely one user being awarded transmit access by the arbitration method in the case of uniquely assigned identifiers.

The introduction of increasingly networked applications, for example, of assistance systems in vehicles, or of networked control systems in industrial plants, results in the general requirement that the bandwidth for serial communication must be increased.

Another protocol, called the "CAN with Flexible Data Rate" or CAN FD, is also known. This protocol uses the bus arbitration method known from the CAN, but increases the bit rate by switching to a shorter bit duration after the end of arbitration up to the Bit CRC Delimiter. The effective data rate is also increased by allowing longer data fields.

CAN FD may be utilized for general communication, but also in specific operating modes, for example, software download or End-of-Line programing or for maintenance work.

Two sets of bit clock configuration registers are usually provided in CAN FD, which define a bit duration for the arbitration phase and another bit duration for the data phase. The bit duration for the arbitration phase has the same restrictions as in Classic CAN networks, the bit duration selected for the data phase may be shorter with respect to the efficiency of the selected transceivers and the requirements of the CAN FD network.

A CAN FD message is made up of the same elements as a Classic CAN message, but which differ in detail. Thus, in a CAN FD message, the data field and the CRC field may be longer. Examples of Classic CAN and CAN FD messages are depicted in FIG. 1.

CAN FD supports both identifier lengths of the CAN protocol, the 11 bit length "Standard Format", which is also called "Base Format", and the 29 bit long "Extended Format". CAN FD messages have the same structure as Classic CAN messages. Classic CAN messages and CAN FD messages are distinguished by a control signal, namely, a reserved control bit, which is always transmitted as dominant in the Classic CAN, bears the name "r0" or "r1", and is located in the control field in front of the Data Length Code. In a CAN FD message, this control bit is transmitted as recessive and is called FDF ("FD Format").

Many other communication systems are acquainted with similar control signals or control bits, by which, for example, different formats may be differentiated. The inventive idea is described below based on CAN. However, the present invention is not limited as a result to CAN bus systems, but may be implemented based on all bus systems, which satisfy the features of the definition of the species of the method described herein.

In the CAN FD messages, unlike the Classic CAN messages, additional control field bits follow, for example, the BRS bit, which indicates the position at which, provided the BRS bit has a corresponding value, the bit duration in a CAN FD message is switched to a shorter value. This is depicted in FIG. 1a by arrows, which divide the messages in a section referred to as "CAN FD Data Phase", in which the high bit rate or the short bit duration is used, and in two sections named "CAN FD Arbitration Phase", where the lower bit rate or the longer bit duration is used.

The number of bytes in the data field is indicated by the data length code. This code is 4 bits wide and is transmitted in the control field. The coding is different in CAN FD than in the Classic CAN. The first nine codes (0x0000 through 0x1000) are the same, but the following codes (0x1001 through 0x1111) correspond to larger data fields of the CAN FD messages, for example, 12, 16, 20, 24, 32, 48 and 64 bits.

Transceivers are bus connection units, which when transmitting, convert the logic signals, which are received, for example, by a communication controller or microcontroller, into the physically provided signals such as, for example, voltage differences between the signal lines. When receiving, the physical signals present on the bus system are received and converted into logic signals.

Classic CAN transceivers may be used for CAN FD, special modified transceivers may optionally contribute to a further increase in the bit rate or may take on additional functionalities.

The CAN FD protocol is described in a protocol specification entitled "CAN with Flexible Data-Rate Specification", referred to below as the CAN FD specification, which may be downloaded on the Robert Bosch GmbH website http://www.semiconductors.bosch.de.

SUMMARY OF THE INVENTION

In the aforementioned networks, all users on the network must have a CAN FD communication controller so that CAN FD communication may be carried out. However, the CAN FD communication controllers are capable of participating in Classic CAN communication. If a Classic CAN user is present in the network, the communication therefore reverts to the Classic Can message format.

One cause for this reversion to the slower communication in mixed networks is the monitoring of the communication by the communication users, which is partly responsible for the high transmission security, for example, in CAN bus systems. Since the unmodified Classic CAN communication controllers are unable to correctly receive the more rapid data bits of the CAN FD messages, they would destroy these messages with error messages (so-called error frames).

Advantages of the Invention

If bus systems are to be upgraded to CAN FD, it may be advantageous, however, to carry this out in increments, i.e., not simultaneously for all bus users. In this way, risk of change and costs may be limited to an acceptable degree. This means, for example: Only the bus users which are to communicate rapidly are replaced, bus users with low data volume remain initially unchanged.

Against this background, it is advantageous to enable a mixed operation of CAN FD and conventional CAN bus users. For this purpose, the CAN FD messages must be kept separate from the incompatible conventional CAN controllers. In this case, it should be possible with a suitable division of the physical bus to shield both individual users of CAN FD messages, as well as entire sub-bus systems.

A sub-bus system in this case is a bus system, which is functional independently, but which may be combined—for example, with the aid of a suitable device—with one or multiple additional sub-bus systems to form a larger bus system.

Our invention advantageously includes a transmission unit for connection to a first bus system, the transmission unit receiving messages via the first bus system, the messages being constructed as a succession of a first bit sequence, at least one control signal and a second bit sequence, the first bit sequence of a received message being forwarded by the transmission unit to a processing station, at least one predefined control signal being checked by the transmission unit, the second bit sequence of the received message being forwarded by the transmission unit to the processing station if the predefined signal of the received message has a predefined value. The transmission unit is characterized in that, instead of the second bit sequence, it sends a predefined or predefinable terminating bit sequence to the processing station if the predefined control signal of the received message has a value that deviates from the predefined value.

Such a transmission unit enables, for example, a mixed operation of CAN FD and conventional CAN bus users. The transmission unit keeps the CAN FD messages separate from the incompatible conventional CAN controllers. With the aid of the present invention, it is possible to shield both individual users of CAN FD messages, but also entire sub-bus systems through a suitable division of the physical bus.

A processing station in this case may be both a user of a bus system connected to the bridging unit, or sub-bus systems, as well as an element connected to the bridging unit such as, for example, a communication controller or a microcontroller. This is further explained in the exemplary embodiments.

It is further advantageous if the transmission unit receives messages in a first format and in at least one additional format via the first bus system, the predefined value of the predefined control signal characterizing the messages in the first format, the predefined or predefinable terminating bit sequence being constructed in such a way that the processing station receives a message in the first format. As a result, commercial processing stations configured to receive messages in the first format may continue to be used. In this way, the processing stations are reliably shielded from the messages in the additional format.

It is further advantageous if the first bit sequence of the received message is forwarded by the transmission unit to the processing station by establishing a physical link between the lines of the first bus system and the lines of the second bus system, the processing station being a user of the second bus system. In this way, the access to the bus system may be generally prioritized among the users of the first and of the second (sub-)bus system, for example, as part of an arbitration method, as it is used in Classic CAN or CAN FD. In addition, such a solution is presentable with a minimum of hardware complexity and ultimately produces a linking of the two sub-bus systems essentially with no additional latency in the message transmission.

It is further advantageous if the physical link is separated if the predefined control signal of the received message has a value that deviates from the predefined value. This prevents users of the second (sub-)bus system from receiving messages in the first format and, for example, sending error signals, since this format is not configured for receiving messages in this format.

In another specific embodiment, it is advantageous if the first bit sequence of the received message is forwarded by the transmission unit to the processing station by transmitting the signals received via the first bus system bit by bit to the lines of a second bus system, the processing station being a user of the second bus system. In this way as well, the access to the bus system may be generally prioritized among the users of the first and of the second (sub-)bus system.

In this case, it is advantageous if, instead of the second bit sequence, the transmission unit sends the predefined or predefinable terminating bit sequence via the second bus system, if the predefined control signal of the received message has a value that deviates from the predefined value. In this way, the users of the second bus system are reliably shielded from the messages, which have the deviating value of the control signal.

In another specific embodiment, it is advantageous if the first bit sequence of the received message is forwarded by the transmission unit to the processing station by transmitting the signals received via the first bus system bit by bit via internal lines to a communication controller or microcontroller as a processing station, the communication controller or microcontroller being configured to process messages in the first format.

Such a transmission unit enables, for example, an operation of users with conventional Classic CAN communication controllers in a bus system, on which CAN FD messages may also be exchanged. The CAN FD messages are kept separate from the incompatible conventional Classic CAN controllers by the transmission unit.

The present invention is particularly advantageously applicable in bus systems, in which the first format is the Classic CAN message format, in which the additional format is the CAN FD message format. In this way, widely common semiconductor elements with Classic CAN may continue to be used in CAN FD bus systems.

It is advantageous that the transmission unit sends the predefined value for the predefined control signal to the processing station if the predefined control signal of the received message has a value that deviates from the predefined value. Thus it is ensured that the processing station receives an intact message according to the first format.

The further descriptions herein define additional advantageous embodiments of the present invention, in particular, a device, which may be used as a bus user or bus connection or bridge element, as well as a method according to the present invention, which also includes the advantages of the transmission unit.

DETAILED DESCRIPTION

Figure 1:
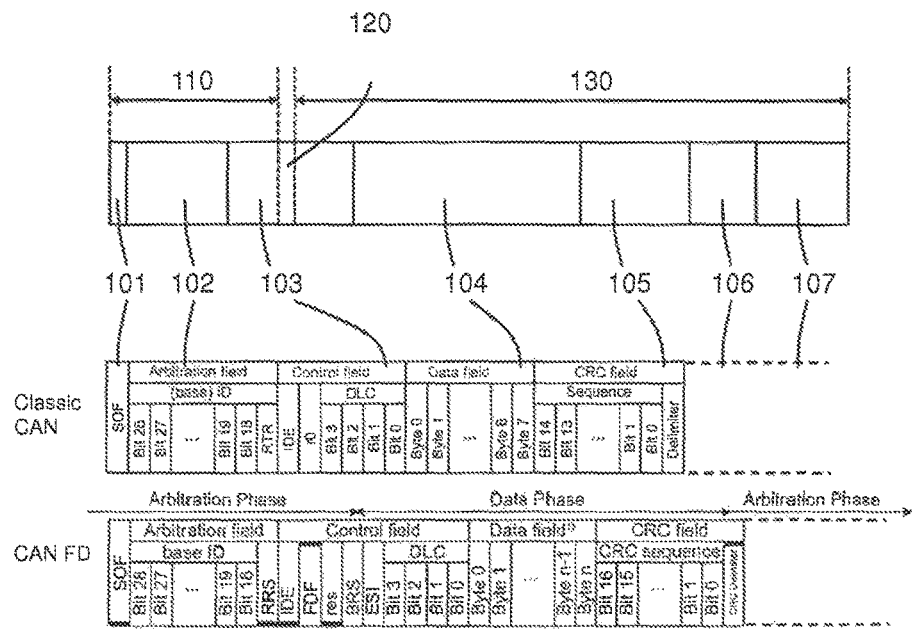
FIG. 1 depicts messages having a common basic structure and specific format differences, as well as the identification by a control signal.

FIG. 1 depicts the basic structure of the transmitted messages with specific format differences based on the example of Classic CAN messages (upper portion of the figure) and CAN FD messages (lower portion of the figure), as well as the identification by a control signal. Only the case with 11 bit addressing is depicted in the case of the Classic CAN messages and CAN FD messages. The present invention is equally applicable to 29 bit addressing.

Generally speaking, messages 100 are constructed as a succession of a first bit sequence 110, of at least one control signal 120 and of a second bit sequence 130. The designations of the message segments are: Start-of-Frame bit 101, Arbitration field 102, Control field 103, Data field 104, CRC field 105, followed by Acknowledge field 106 and End-of-Frame field 107. The detailed succession of the bits for the selected example of 11 bit Classic CAN and CAN FD is indicated in the figure. The at least one control signal 120 is a single control bit in the selected example in Control Field 103 at the position, which is identified in CAN FD messages by FDF. Control signals may also include multiple bits of a message in conjunction with the present invention.

In general, the English designations, as they are specified in the Standard ISO 11898, are used for the message segments of the CAN messages.

The bus is in the state without data transmission before the Start-of-Frame bit 101 and after the End-of-Frame field 107. The optional bit rate switch, which may occur in CAN FD messages, takes place in the area of the CAN FD message referred to as "Data Phase", thus, it starts with the BRS bit ("Bit Rate Switch") and ends with the CRC delimiter.

The present invention is explained by way of example of Classic CAN and CAN FD, but is also applicable to arbitrary other bus systems, in which different message formats are characterized by one or multiple control signals or control bits at fixed bit positions within the message.

The present invention is described in greater detail in the following exemplary embodiments for the case in which a single control bit is present as the control signal. For those skilled in the art, however, it is clear that the present invention is also applicable to message formats having control signals made up of multiple control bits.

Figure 2:
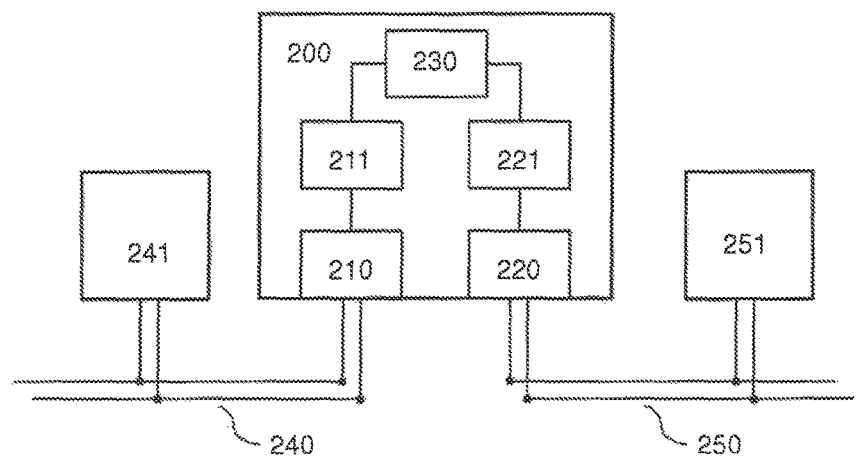
FIG. 2 schematically shows a bus system including a known bridge, to which two sub-bus systems are connected.

In the known approach using a bridge depicted in FIG. 2, a message is filtered using a filter unit. Bridge 200 includes two transceivers or bus connection units 210 and 220. A first sub-bus system 240 having at least one user 241 is connected to first transceiver 210. A second sub-bus system 250 having at least one user 251 is connected to second transceiver 220. Bridge 200 includes a first communication controller 211, which connects first transceiver 210 to a filter unit 230. Bridge 200 also includes a second communication controller 221, which connects second transceiver 220 to filter unit 230.

In the bridge, a complete message from a transmitting user, for example, user 241, is received via first sub-bus system 240 and first transceiver 210 in communication controller 211 assigned to this sub-bus system and saved in a suitable message memory or memory buffer. Filter unit 230 within bridge 200 evaluates the received and saved message and decides whether the message is read by second communication controller 211, which is assigned to second sub-bus system 250, out of the message memory and transmitted via second transceiver 220 to second sub-bus system 250. Similarly, a filtered message transmission takes place in the opposite direction from second sub-bus system 250 to first sub-bus system 240. The two sub-bus systems are separated physically from one another.

The bridge may, for example, forward the message received by first sub-bus system 240 to second sub-bus system 250 if a control signal at a fixed position of the message (for example, the FDF bit of a CAN FD message) has a predefined value.

The disadvantages of this known approach are that two communication controllers and message memories must be provided. In addition, relatively lengthy latency periods occur between the two sub-bus systems, because the message must be completely received and saved before the filter unit decides whether it is sent on the other sub-bus system. It may also be disadvantageous that the arbitration mechanism for the CAN messages or CAN FD messages, which determines the prioritization of the bus access in the event of simultaneous transmission attempts of multiple users, takes place separately in the separate sub-bus systems.

Figure 3:
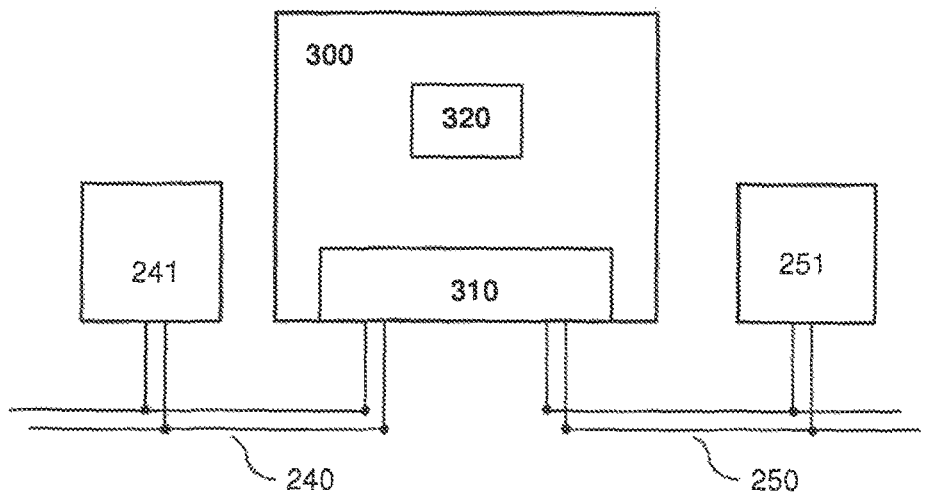
FIG. 3 schematically shows a bus system including a device according to the present invention with a transmission unit, to which two sub-bus systems are connected.
Figure 4:
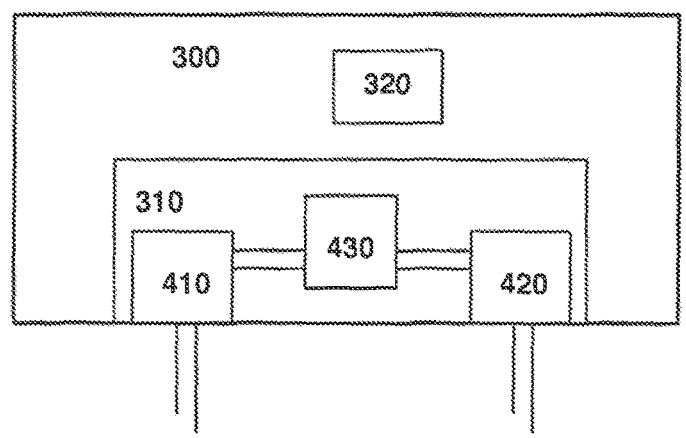
FIG. 4 shows a schematic block diagram of a first specific embodiment of the transmission unit according to the present invention.

In contrast, with a device having a transmission unit according to our invention, a physical separation of the bus system into a first sub-bus system and a second sub-bus system is prevented or is carried out for a limited period, as is depicted in the following exemplary embodiments:

Exemplary Embodiment 1 (FIGS. 3 and 4)

FIG. 3 schematically shows a bus system having a device according to the present invention, to which two sub-bus systems are connected. FIG. 4 shows a schematic block diagram of a first specific embodiment of the present invention.

Device 300 according to the present invention includes a transmission unit 310 according to the present invention, and optionally additional components 320. Component 320 depicted is representative of various optional components, for example, for control, energy supply, etc., which may be provided in device 300. A first sub-bus system 240 having at least one user 241 and a second sub-bus system 250 having at least one user 251 are connected to device 300 via transmission unit 310 according to the present invention. Each sub-bus system includes, for example, two lines, for example, two copper lines, which are insulated from one another.

Transmission unit 310, as depicted in FIG. 4, may include two transceivers or bus connection units 410 and 420. First sub-bus system 240 having at least one user 241 is connected to first transceiver 410. Second sub-bus system 250 having at least one user 251 is connected to second transceiver 420. Alternatively, both transceivers may also be configured to be integrated into one single component.

Transmission unit 310 also includes a protocol check unit 430, which is configured to check the value of a fixed control signal in the received message in at least one of the connected sub-bus systems. In the following, it is assumed that the value of a control signal of messages of the first sub-bus system may be checked.

Transmission unit 310 according to the present invention or device 300 is transparent, as long as no data or message bits are transmitted on first sub-bus system 240. The two connected sub-bus systems are electrically connected by device 300. Thus, the two sub-bus systems 240 and 250 are combined by the device to form a single physical bus. A voltage difference applied by first user 241 to first sub-bus system 240, is also present at second sub-bus system 250 for second user 251.

In an alternative specific embodiment, the data or message bits are forwarded bit by bit almost instantaneously, but the physical implementations of the signals (for example, voltage differences) may vary.

If a message is transmitted on first sub-bus system 240, for example, by user 241 applying alternating voltage differences to the lines of sub-bus system 240, then device 300 according to the present invention checks the values of the voltage differences, i.e., of the message bits.

Protocol check unit 430 is configured to check and almost instantaneously output the received message bits on second connected sub-bus system 250. If a predefined control signal provided at a fixed position within the message has a predefined value, the entire message is output on second connected sub-bus system 250. In the case of a deviating value of the predefined control signal, a predefined or predefinable or ascertained terminating bit sequence, i.e., a predefined or predefinable or ascertained bit sequence, instead of message bits received after the predefined control signal, is output on second sub-bus system 250 by transmission unit 310 or by protocol check unit 430 in order to complete the message for users 251 of the second sub-bus system. In this case, it may be necessary to ascertain the terminating bit sequence as a function of the previously received message bits, in order to complete the message for users 251 of the second sub-bus system in a valid manner.

The messages having different formats, i.e., in the present example, the messages with conventional Classic CAN format and with CAN FD format are distinguishable by the control bit identified in FIG. 1 by FDF.

Generally speaking, messages are received by the device via the first bus system, the messages being constructed as a succession of a first bit sequence, of at least one control signal and of a second bit sequence, the first bit sequence of a received message being forwarded by the device to a processing station, at least one predefined control signal being checked by the device. If the predefined control signal of the received message has a predefined value, the second bit sequence of the received message is forwarded by the device to the processing station.

If the predefined control signal of the received message has a value that deviates from the predefined value, the device sends a predefined or predefinable terminating bit sequence instead of the second bit sequence to the processing station. The terminating bit sequence may be ascertained as a function of the first bit sequence.

In the present example with Classic CAN or CAN FD bus systems, it is advantageous that already the recessively received FDF bit characterizing CAN FD messages is forwarded as a dominant bit in the Classic CAN sub-bus. The predefined control bit is therefore always output with a fixed value on the second sub-bus system, regardless of the value of the control bit received on the first sub-bus system.

In the specific embodiment with Classic CAN or CAN FD bus systems, the device completes the message with a terminating bit sequence, which contains a data length code with the value zero, i.e., DLC=0x0000, in the event the predefined control bit of the received message has a value deviating from the predefined value. The message contains no Data field (FIG. 1, Data field). The Data Length Code is followed by the CRC field, the Acknowledge field and the End-of-Frame field. The CRC field is ascertained as a function of the previously received message bits. This ensures that the message sent on the second sub-bus system is a valid Classic CAN message, and that this message takes no longer than the original message received on the first sub-bus system. This prevents the sending of a subsequent message on the first sub-bus system from already starting while the terminating bit sequence is still being sent on the second sub-bus system.

The message completed by the terminating bit sequence is used only to avoid protocol violations on the second sub-bus system and may be rejected during the acceptance filtering by users 251 of the second sub-bus system.

When the reception of the message by the first sub-bus system is completed, the first and the second sub-bus system are reconnected to form a single physical bus.

Corresponding terminating resistances are to be selected or deselected as a function of the respective physical transmission standard in order to optimize the transmission characteristics of the sub-bus systems and of the connected bus system.

Figure 5:
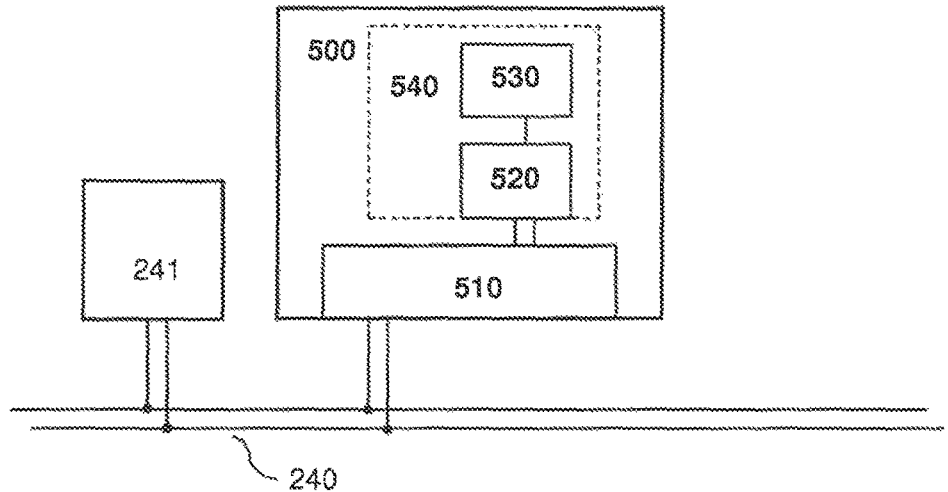
FIG. 5 schematically shows a bus system including a device according to the present invention with a transmission unit, by which the device is connected to the bus system.
Figure 6:
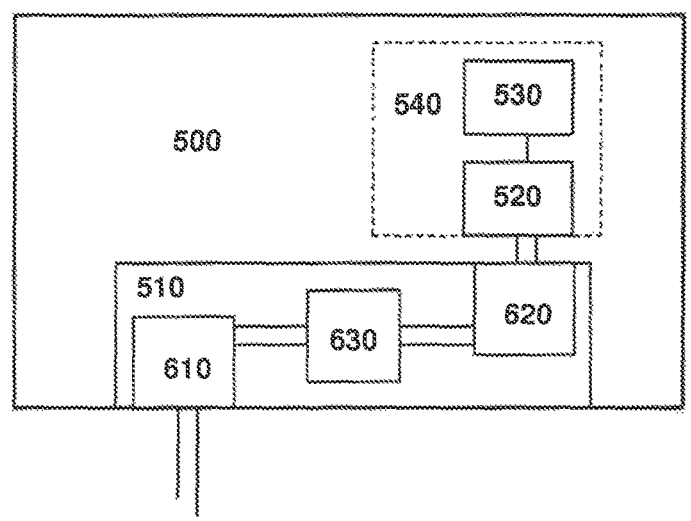
FIG. 6 shows a schematic block diagram of a second specific embodiment of the transmission unit according to the present invention.

Exemplary Embodiment 2 (FIGS. 5 and 6)

FIG. 5 schematically shows a bus system having a device according to the present invention, which is connected to the bus system. FIG. 6 shows a schematic block diagram of a second specific embodiment of the present invention.

Device 500 according to the present invention includes a transmission unit 510 according to the present invention, as well as a communication controller 520 and a microcontroller 530. Communication controller 520 and microcontroller 530 may also be integrated into a single semiconductor element 540, which is indicated in FIG. 5 by a dashed line. Device 500 is connected via transmission unit 510 according to the present invention to a bus system 240 having at least one additional user 241. The bus system includes two lines, for example, two copper lines, for example, which are insulated from one another.

Transmission unit 510, as depicted in FIG. 6, includes a transceiver or a bus connection unit 610. Bus system 240 having at least one user 241 is connected to transceiver 610.

Transmission unit 510 also includes a protocol check unit 630, which is configured to check the value of a fixed control signal in the messages received via the connected bus system. Finally, transmission unit 510 includes a transfer unit 620, which transfers the suitable signals to communication controller 520.

When transmitting, transmission unit 510 behaves like a conventional transceiver for bus system 240 if device 500 wishes to send a message via bus system 240.

As long as no data or message bits are transmitted on first sub-bus system 240, transmission unit 510 according to the present invention assumes the function of a conventional transceiver and observes the line level.

If a message is transmitted on first sub-bus system 240, for example, by user 241 applying alternating voltage differences to the lines of sub-bus system 240, transmission unit 510 according to the present invention then receives the values of the voltage differences, i.e., the message bits.

Protocol check unit 630 is configured to check the received message bits and to transfer them almost instantaneously via transfer unit 620 to communication controller 520. If a predefined control signal provided at a fixed position within the message has a predefined value, the entire message is transferred to communication controller 520. In the case of a deviating value of the predefined control signal, a predefined or predefinable or ascertained terminating bit sequence, i.e., a predefined or predefinable or ascertained bit sequence, instead of the message bits subsequently received after the predefined control signal, is transferred to communication controller 520 in order to complete the message. In this case, it may be necessary to ascertain the terminating bit sequence as a function of the previously received message bits, in order to complete the message for communication controller 520 in a valid manner.

The messages having different formats, i.e., in the present example, the messages with the conventional Classic CAN format and with the CAN FD format, are distinguishable by the control bit identified in FIG. 1 by FDF.

Generally speaking, messages are received by the device via the first bus system, the messages being constructed as a succession of a first bit sequence, of at least one control signal and of a second bit sequence, the first bit sequence of a received message being forwarded by the device to a processing station, at least one predefined control signal being checked by the device. If the predefined control signal of the received message has a predefined value, the second bit sequence of the received message is forwarded by the device to the processing station.

If the predefined control signal of the received message has a value that deviates from the predefined value, the device sends a predefined or predefinable or ascertained terminating bit sequence, instead of the second bit sequence, to the processing station. The terminating bit sequence may be ascertained as a function of the first bit sequence.

In the specific embodiment with Classic CAN or CLASSIC FD bus systems, the device completes the message with a terminating bit sequence, which contains a Data Length Code with the value zero, i.e., DLC=0x000, in the event the predefined control bit of the received message has a value that deviates from the predefined value. The message contains no Data field (FIG. 1, Data field). The Data Length Code is followed by the CRC field, the Acknowledge field and the End-of-Frame field. The CRC Field is ascertained as a function of the previously received message bits. This ensures that the message sent to communication controller 520 is a valid Classic CAN message, and that this message takes no longer than the message originally received on the first bus system. This prevents the sending of a subsequent message on the first bus system from already starting, while communication controller 520 is still receiving the terminating bit sequence.

In the present example with Classic CAN or CAN FD bus systems, it is advantageous that already the recessively received FDF bit characterizing CAN FD messages is forwarded as a dominant bit to communication controller 520. The control bit is therefore always transferred with a fixed value to communication controller 520, regardless of the value of the control bit received on the bus system.

As mentioned above, only the case in which the messages include one single control bit is depicted in detail in the exemplary embodiments. The present invention may easily be applied to the case in which the control signal is made up of multiple bits.

For example, two bits could be used in order to differentiate between four different message formats F1, F2, F3 and F4. The bit sequence "00" as a control signal signals format F1, bit sequence "01" signals format F2, bit sequence "10" signals format F3, bit sequence "11" signals format F4. A predefined or predefinable or ascertained terminating bit sequence, instead of the second bit sequence received after the control signal, is sent to the processing station only for messages having the control signal "11".

In the event that multiple control bits or control signals are used for differentiating multiple different message formats, the present invention may also be applied, for example, by a cascading. This means, in the case of each control signal or control bit, it is decided as a function of the value whether the received message bits are transferred to the respective processing station or, instead, a terminating bit sequence suitable for this control signal is transferred. The terminating bit sequence in this case is selected or ascertained as a function of the respective control signal in such a way that the processing station receives a valid message.

What is claimed is:

1. A transmission unit for connection to a first bus system, comprising:
    a receiving unit to receive messages via the first bus system, the messages being constructed as a succession of a first bit sequence, of at least one control signal and of a second bit sequence;
    a forwarding unit to forward the first bit sequence of a received message to a processing station;
    a checking unit to check at least one predefined control signal of the received message;
    wherein the second bit sequence of the received message is forwarded to the processing station if the predefined control signal of the received message has a predefined value, and
    wherein instead of the second bit sequence, a predefined or predefinable terminating bit sequence is sent to the processing station if the predefined control signal of the received message has a value that deviates from the predefined value.

2. The transmission unit of claim 1, wherein the transmission unit receives messages in a first format and in at least one additional format via the first bus system, the predefined value of the predefined control signal characterizing the messages in the first format, the predefined or predefinable terminating bit sequence being constructed in such a way that the processing station receives a message in the first format.

3. The transmission unit of claim 1, wherein the predefined or predefinable terminating bit sequence is constructed so that the message in the first format received by the processing station ends no later than the message received via the first bus system.

4. The transmission unit of claim 1, wherein the first bit sequence of the received message is forwarded by the transmission unit to the processing station by establishing a physical link between the lines of the first bus system and the lines of a second bus system, the processing station being a user of the second bus system.

5. The transmission unit of claim 4, wherein the physical link is separated if the predefined control signal of the received message has a value that deviates from the predefined value.

6. The transmission unit of claim 1, wherein the first bit sequence of the received message is forwarded by the transmission unit to the processing station by transmitting the signals received via the first bus system bit by bit to the lines of a second bus system, the processing station being a user of the second bus system.

7. The transmission unit of claim 6, wherein instead of the second bit sequence, the transmission unit sends the predefined or predefinable terminating sequence via the second bus system if the predefined control signal of the received message has a value that deviates from the predefined value.

8. The transmission unit of claim 2, wherein the first bit sequence of the received message is forwarded by the transmission unit to the processing station by transmitting the signals received via the first bus system bit by bit via internal lines to a communication controller or microcontroller as a processing station, the communication controller or microcontroller being configured to process messages in the first format.

9. The transmission unit of claim 1, wherein the first format is the CAN message format and the additional format is the CAN FD message format.

10. The transmission unit of claim 1, wherein the transmission unit sends the predefined value for the predefined control signal to the processing station if the predefined control signal of the received message has a value that deviates from the predefined value.

11. The transmission unit of claim 1, wherein the transmission unit includes a semiconductor element or an integrated circuit.

12. A device for connection to a bus system, comprising:
at least one transmission unit for connection to a first bus system, including:
  a receiving unit to receive messages via the first bus system, the messages being constructed as a succession of a first bit sequence, of at least one control signal and of a second bit sequence;
  a forwarding unit to forward the first bit sequence of a received message to a processing station;
  a checking unit to check at least one predefined control signal of the received message;
  wherein the second bit sequence of the received message is forwarded to the processing station if the predefined control signal of the received message has a predefined value, and
  wherein instead of the second bit sequence, a predefined or predefinable terminating bit sequence is sent to the processing station if the predefined control signal of the received message has a value that deviates from the predefined value.

13. A method for receiving messages via a first bus system, the messages being constructed as a succession of a first bit sequence of at least one control signal and of a second bit sequence, the method comprising:
  forwarding the first bit sequence of a received message to a processing station;
  checking at least one predefinable control signal of the received message;
  forwarding, if the predefined control signal of the received message has a predefined value, the second bit sequence of the received message to the processing station; and
  sending, if the predefined control signal of the received message has a value that deviates from the predefined value, a predefined or predefinable terminating bit sequence, instead of the second bit sequence, to the processing station.

14. The method of claim 13, wherein messages in a first format and in at least one additional format may be received via the first bus system, the predefined value of the predefined control signal characterizing the messages in the first format, the predefined or predefinable terminating bit sequence being constructed in such a way that the processing station receives a message in the first format.

* * * * *